April 10, 1928.
F. LAMOTKE
1,665,630
FUEL ECONOMIZER
Filed Jan. 21, 1927
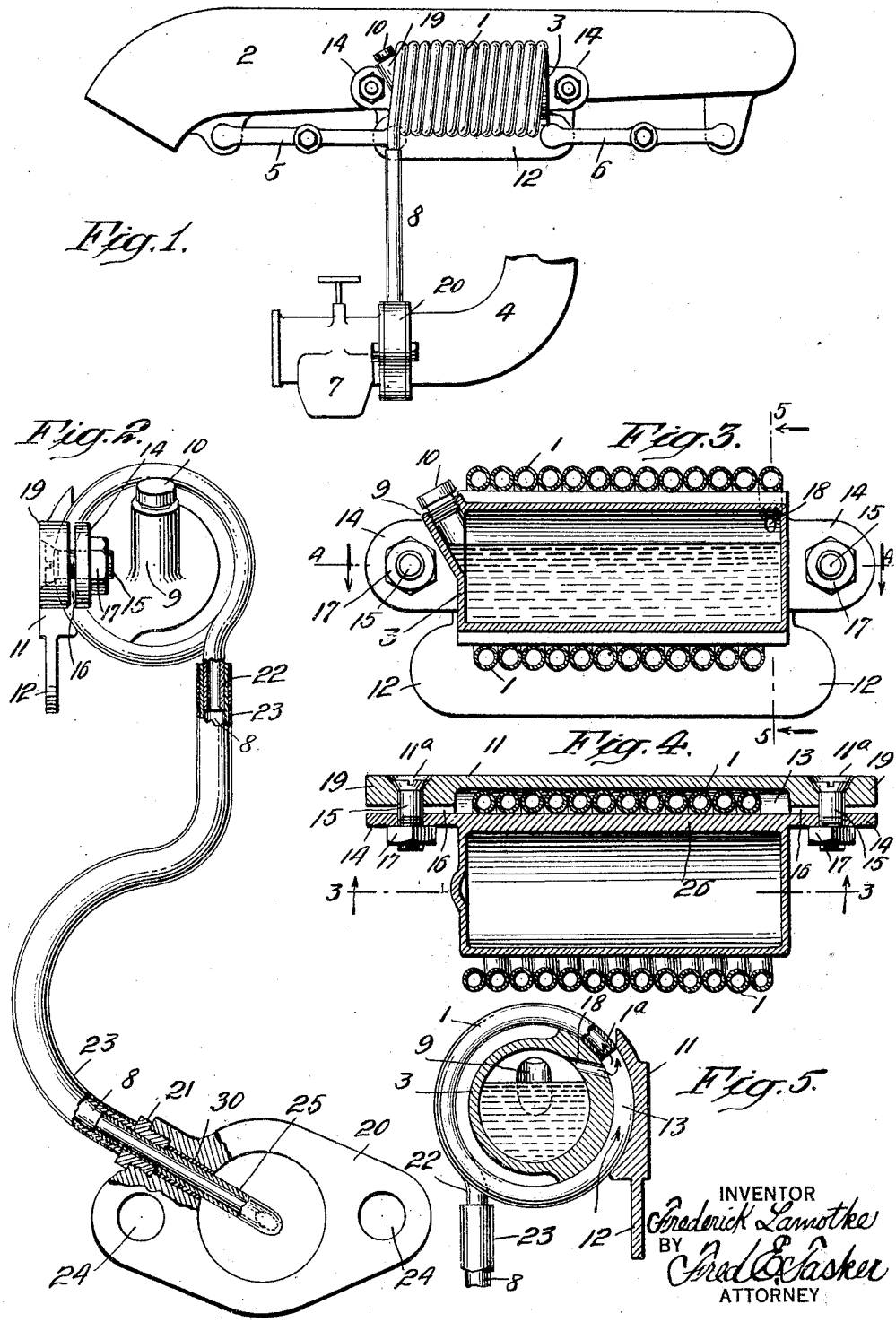
INVENTOR
Frederick Lamotke
BY
Fred E. Fasker
ATTORNEY Patented Apr. 10, 1928.

1,665,630

UNITED STATES PATENT OFFICE.

FREDERICK LAMOTKE, OF TEANECK, NEW JERSEY, ASSIGNOR OF ONE-HALF TO WILLIAM H. WETTLAUFER, OF ENGLEWOOD, NEW JERSEY.

FUEL ECONOMIZER.

Application filed January 21, 1927. Serial No. 162,587.

This invention relates to certain new and useful improvements in fuel saving and economizing devices for use with internal combustion and other explosion engines or motors.

One object among many that might be mentioned is to greatly increase the mileage attainable in high speed motor cars with a given quantity of combustible fuel. The invention thus aims to promote efficiency and economy. The invention relates particularly to means for admitting either air alone or superheated vapor, as alcohol, air and water, or any other material or substance, into the fuel after it has been mixed, or in using pure alcohol slightly mixed with water as a primary fuel for combustion engines, or in utilizing other fuel material.

Another important object of the invention is to provide a superheating device or attachment, which will permit vapors which are rich in hydrogen to be united with the fuel mixture, the quantity of the same being automatically regulative or self-adjusting, by virtue of the length, diameter and capacity of conducting pipes and other mechanical members, by taking advantage of the friction against the flow of vapor through a pipe coil of sufficient length.

A further object is to carry the heated vapor, air or other material to the discharge nozzle which is in the fuel mixture through a tube or conductor fully insulated with asbestos or similar material.

In the practice of the invention I generally employ a simple mechanical attachment on the engine, which is heated thereby, or by an exhaust member, and usually consists of a pipe coil, of general cylindrical form, and which automatically provides an auxiliary supply of heated atmospheric air which is added as required in predetermined amounts to the motor fuel after the same has been mixed in the carburetor.

And the invention also embraces a tank or compartment supported within the pipe coil which surrounds it, which tank contains any suitable liquid or fluid that contains hydrogen and that will form a vapor when boiled or heated by the caloric energy from the engine and the pipe coil, the vapor so created being delivered in proper quantity to the air entering the pipe coil, so that it may be mixed with the air and a united auxiliary supply of vaporized or volatilized liquid or fluid may be carried through the pipe coil and be delivered to the fuel mixture.

And the invention further consists essentially in the construction, arrangement, and combination of parts, substantially as will be hereinafter described and then particularly pointed out in the claims.

In the accompanying drawing illustrating my invention:

Figure 1 is a side elevation of my improved fuel economizer shown as operatively applied to the outlines of a gas engine.

Figure 2 is an end elevation of the same, with a few details in section.

Figure 3 is a vertical longitudinal section on line 3, 3, of Figure 4 of the pipe coil attachment, the tank, and cooperating parts, with certain features in elevation.

Figure 4 is a horizontal section on the line 4, 4, of Figure 3.

Figure 5 is a cross-sectional elevation on the line 5, 5, of Figure 3.

Similar characters of reference designate like parts in all the figures of the drawing.

1 denotes a coil of pipe, the same being in the form of a cylinder, which is supported preferably in a horizontal position contiguous to the exhaust manifold 2 of a gas engine, as indicated in Figure 1. The diameter and other dimensions of the piping and of the coil may vary within very wide limits. Said coil is thus supported so that it will receive the heat developed by the operation of the engine and thus be itself heated throughout its length so as to raise the temperature of the fluid or liquid, air, vapor or other substance. Its multiple winds afford a long path for the air or other substances. One end, as 1ª, of coil 1, receives the air or vapor, while the other end, as 22, connects with a pipe 8, which conveys the air or vapor heated in coil 1 and delivers the same in any desired manner into the fuel mixture in the intake manifold 4, after such mixture leaves the carburetor 7, as indicated in Figure 1.

Obviously there are many ways in which the coil 1 may be supported in position, but one convenient way is to utilize the clamps 5 and 6 which hold the exhaust manifold 2 in place, and allows said clamps to grip the flange 12 of a recessed plate or bar 11, which is thus held tightly against the manifold 2, and to which bar 11 the coil is closely applied and secured and held by mechanical attaching means which I shall presently describe.

The bar or plate 11, which may partake of any desired form, is recessed or shallowed out to furnish a depression, pocket, or cavity 13, with a curved bottom against and in which the coil 1 is located, see Figures 4 and 5, with the open end 1ª of the coil 1 open into cavity 13 to receive into it any air or vapor that may be in said cavity.

The coil 1 is thus held in cavity 13 and against the plate 11 by means of a bar or plate or strip 26, that passes through coil 1 and binds against it, pressing it close in cavity 13, said bar 26 being parallel to plate 11, and having ends or ears 14, 14, thereon that are secured to the ends or ears 19, 19, of plate 11 by screws or bolts 15 provided with nuts 17 and passing through holes 11ª in ears 19 and coincident holes in ears 14, it being noted that spaces 16 are left between the ears 14 and the ears 19, after the bolts are screwed tight, since the depth of cavity 13 and the thickness of the winds of coil 1 do not permit the plates 11 and 26, or their projecting ears to come into contact, and these spaces 16 that are thus left (see Figure 4), allow of the entrance of atmospheric air from the outside into cavity 13 from which it will pass into the coil 1 to be heated therein and supplied to the fuel mixture. Of course any other vapor or fluid or liquid material that may enter cavity 13 will also be supplied to the coil 1, through the vacuum action in the coil from the engine intake and engine.

The plate 26 which binds against the coil 1 and holds it in place, may be used alone, but it usually forms one side of a small tank or box 3, which is thus carried lengthwise in the space inside the pipe coil. Tank 3 has a filling nozzle 9 provided with a cap 10, and at the other end it has an outlet opening 18 to allow vapor to emerge from tank 3 into cavity 13 near the mouth 1ª of pipe 1, so as to mingle there with the air filling cavity 13 through the slits 16, so that commingled air and vapor may pass through the coil 1 to the fuel mixture in intake 4. The tank may have other features besides those mentioned. The tank 3 may contain any solution, or fluid or liquid, as alcohol, or glycerine, or the like, which mingled with water or air may become superheated and pass on to enrich the combustible mixture. An important fact is that it may contain any liquid or substance containing hydrogen.

The delivery end 22 of coil 1 connects with a pipe 8 which runs to the fuel line. I insert a washer 20 having perforations 24, 24, between carburetor 7 and end of intake pipe 4. This washer may be of any material. A nozzle 25 runs through the washer 20 and connects by screwing or otherwise with pipe 8, the same being heat insulated by a fibre bushing or similar material 30, and to assist in this I find it advisable to use a lava bushing 21 or other heat resistor. Pipe 8 is preferably covered with asbestos 23 or other means for retaining heat.

From this explanation it will be recognized that the principal idea of my invention is to add hot air or vapor or any desired vaporous liquid or fluid to the gaseous fuel, or to the air already carburetted, after the same leaves the carburetting or mixing device, so that the quantity of fuel for a given amount of gasoline may be greatly increased, and the cost of same decreased, the proportion of air thus used being greatly increased, and conversely the proportion of gasoline or other gas in the fuel mixture being decreased; and this is accomplished by heating an additional supply of air for the fuel mixture in an elongated tube wound in a large number of close winds into a cylindrical pipe coil, whose inlet is in an air-receiving cavity; and either using the pipe coil alone or combining with it a liquid-containing tank mounted so as to be enveloped and heated by the pipe coil, which tank emits vapor or volatilized material that may unite in the air-receiving cavity with air passing into and through the pipe coil.

By the use of a pipe coil the course of the air, or air and vapor, is thus greatly varied and elongated so that the air may be brought into contact with a series of hot winds and more thoroughly heated and superheated, and when finally discharged into the intake fuel system it will be very hot and will readily unite with the fuel mixture and assist in a more complete and thorough volatilization of said mixture, thereby giving it greater elasticity and explosive power when it is ignited in the cylinder.

It will be seen that superheated clean air or any fluid or liquid will enter the fuel intake line after the gas has been mixed with air in a standard carburetor or mixing valve and will be added to this mixture, causing such united gases to be further gasified; also this superheated air so introduced will increase the volume of the mixture, so that less raw fuel is required without changing the power output. Also, since gasoline fuel mixtures contain the relative proportions of constituents required for complete combustion as now set on all standard makes of carburetors, especially those for automobile motors, no additional air could be introduced before the mixture strikes the mixing chamber, and I have demonstrated that the superheated air introduced after the mixing will greatly improve the ignition effect, for the mixture is more uniform and the charge is not retarded in burning.

What I claim is:

1. In a device of the class described, the combination with an internal combustion engine and intake means for supplying fuel mixture thereto, of a pipe coil in cylindrical form, means for supporting it in position to be heated by the engine, and a tank supported inside of the pipe coil, said tank containing a liquid to be vaporized by heat and a chamber for commingling the vapor and air for introduction into the pipe coil, and means for delivering said heated mixture to the fuel intake means.

2. In a device of the class described, the combination with an internal combustion engine, and intake means for supplying a fuel mixture thereto, of a pipe coil in cylindrical form, a recessed plate secured to the engine and holding the pipe coil therein, with its inlet end opening into the recess in the plate, and means running through the coil and secured in spaced relation to the recessed plate and firmly against the pipe coil, in order to permit outside air to enter through the space between the plates into the recess in said plate.

3. In a device of the class described, the combination with the exhaust outlet of a gas engine, of a pipe coil secured on said outlet, a recessed plate holding the coil, means running through the coil consisting of a liquid-containing tank secured to the recessed plate in spaced relation thereto and against the pipe coil, in order to permit outside air to commingle with vapor from the tank in the recessed plate, so as to enter the pipe coil, together with means for conveying this superheated auxiliary fuel to the fuel mixture.

4. In a device of the class described, the combination with a gas engine and a fuel intake therefor, of a pipe coil supported on the engine, a plate for holding it in position having a recess or cavity communicating with the coil, a tank inside the coil secured to said plate in spaced relation thereto to provide an air inlet entering the cavity, said tank having a vapor outlet into the cavity, and means for carrying the contents of the pipe coil received from the cavity to the fuel intake.

5. The combination with an internal combustion engine and its fuel intake, of a liquid-containing tank supported on the engine, coil means surrounding the same for imparting thereto heat derived from the engine so that the liquid may be vaporized, and a chamber receiving atmospheric air from without and vapor from the tank, which air and vapor are commingled in said chamber for introduction into the pipe coil, and means for conveying said heated mixture to the fuel intake means of the engine.

In testimony whereof I hereunto affix my signature.

FREDERICK LAMOTKE.